United States Patent [19]

Lewis

[11] Patent Number: 4,653,972

[45] Date of Patent: Mar. 31, 1987

[54] BOOKBINDING MACHINE

[75] Inventor: Robert M. Lewis, London, England

[73] Assignee: Portals Engineering Limited, London, England

[21] Appl. No.: 691,648

[22] Filed: Jan. 15, 1985

[30] Foreign Application Priority Data

Feb. 3, 1984 [GB] United Kingdom ................. 8402950

[51] Int. Cl.⁴ ........................ B42C 11/02; B42C 9/00; B65G 17/00; B65G 37/00

[52] U.S. Cl. ........................................ 412/19; 412/37; 198/343; 198/465.4

[58] Field of Search .................... 412/4, 12, 19, 26, 37; 198/343, 472; 418/4, 12, 19, 37

[56] References Cited

U.S. PATENT DOCUMENTS

| | | | |
|---|---|---|---|
| 1,931,244 | 10/1933 | Alger et al. | 412/37 |
| 2,548,131 | 4/1951 | Stern | 198/472 |
| 2,640,607 | 6/1953 | De Burgh | 198/472 |
| 3,256,970 | 6/1966 | Fievet | 198/343 |
| 3,413,669 | 12/1968 | Thorp | 198/343 |
| 3,731,330 | 5/1973 | French | 412/19 |

FOREIGN PATENT DOCUMENTS 1025268 4/1966 United Kingdom .

*Primary Examiner*—Paul A. Bell
*Assistant Examiner*—Paul M. Heyrana, Sr.
*Attorney, Agent, or Firm*—Parkhurst & Oliff

[57] ABSTRACT

A bookbinding machine includes an advancing track of chain, a plurality of book clamps driveable by said chain successively to one or more processing stations, and means for arresting the movement of a selected one or a plurality of the clamps at one or more of said stations, such as a cover applying and nipping station, while the other clamps remain in motion driven by the chain. The arresting means comprises sprockets for causing a stud on the drive chain to be disengaged from a bracket bolted to the book clamp, to perform an excursion, and to reengage the bracket.

6 Claims, 4 Drawing Figures

BOOKBINDING MACHINE

BACKGROUND OF THE INVENTION

This invention relates to a bookbinding machine. In this specification the word "book" is used to denote a collated assembly of pages to be received in a cover.

A conventional bookbinding machine comprises one or more book-holding clamps drivable from a loading station through a plurality of processing stations, for example a cutting station, a glue feeding station, a cover applying station and a nipping station for pressing the cover on to the cut and glued back of the book. The machine usually also includes a means for automatically opening the clamp to allow the bound book to fall.

SUMMARY OF THE INVENTION

It is an objective of the present invention to provide an improved bookbinding machine.

According to the present invention there is provided a bookbinding machine comprising an advancing track of chain, or functional equivalent, a plurality of book clamps drivable by said track successively to one or more processing stations, and means for arresting the movement of a selected one or a plurality of the clamps whilst the other clamps remain in motion driven by the track. The track will conveniently advance around a closed path.

In a typical machine in accordance with the invention there are three clamps. Clamps are arrested at loading and cover applying stations whilst the other clamp, holding a book, moves through the cutting and gluing stations.

In an embodiment of the invention the arresting of the motion of a clamp at a working station is achieved by disengaging the clamp from the track, for example by causing the track at the station to perform an excursion returning to said clamp at the station to continue the drive motion after a predetermned interval.

BRIEF DESCRIPTION OF THE DRAWINGS

The invention will now be more fully described by way of example and with reference to the accompanying drawings wherein.

DESCRIPTION OF THE PREFERRED EMBODIMENTS

Figure 1:
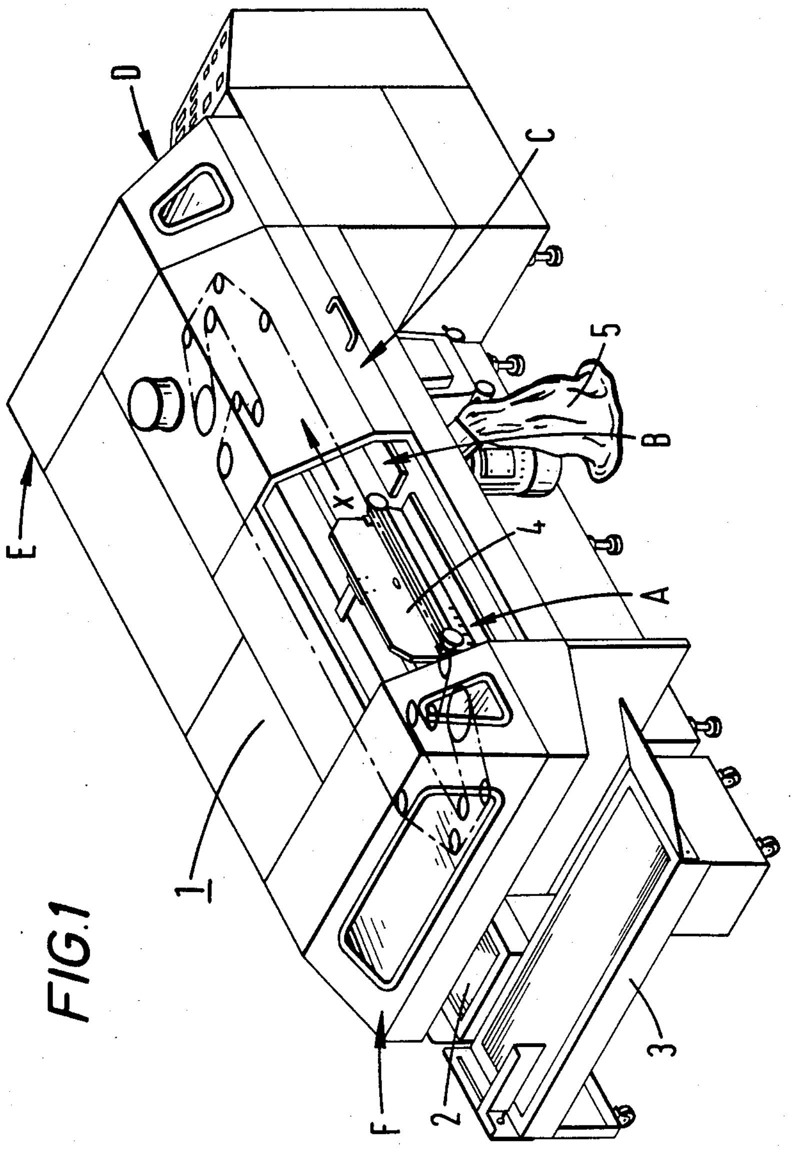
FIG. 1 is a perspective view of a bookbinding machine in accordance with a specific embodiment of the present invention.

Referring initially to FIG. 1 of the drawings, the machine illustrated comprises a casing 1 providing for a plurality of processing stations. A is a loading station wherein the books to be bound are inserted into an open clamp, B is a cutting station where the backs of the books are prepared to receive adhesive, C is an adhesive applying station, D is a station at which covers are applied, E is a nipping station wherein the cover is applied to the bound and glued book and nipped to complete the binding operation, whilst F is the discharge station wherein the clamp is automatically opened and the bound books allowed to fall down a chute to a conveyor 2 which conveys them to trolley 3. Station E can be well seen in FIG. 3.

Figure 3:
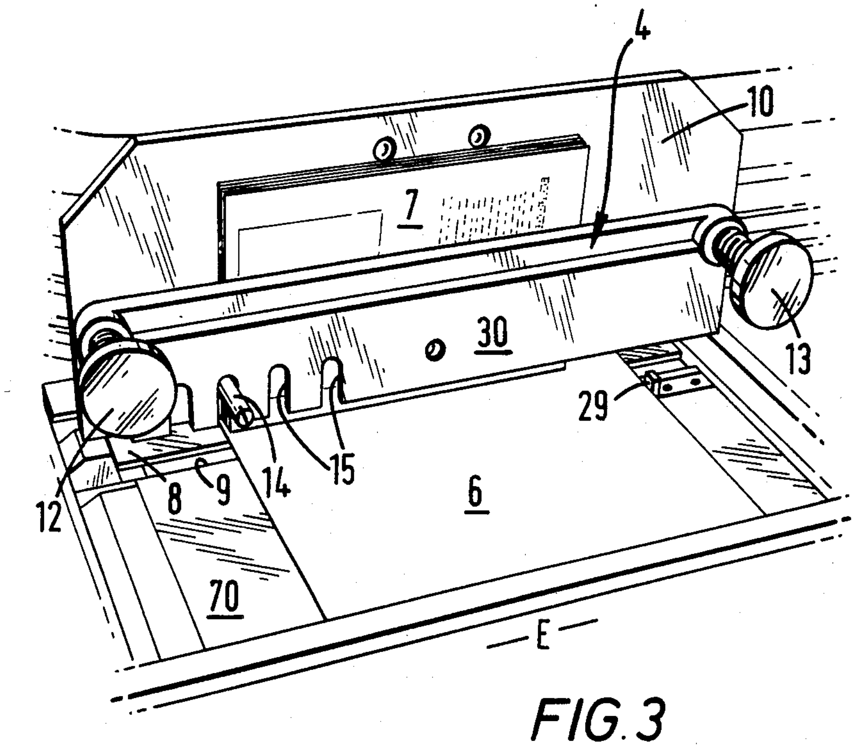
FIG. 3 is a detail of one of the processing stations.

Although the functions performed at these stations are in essence conventional, a brief description will be given. The book clamp 4, open after the discharge from station F, is loaded by an operator with the collated pages of a book at station A, an appropriate delay being provided by the means according to the invention to be described hereinafter. The loaded clamp 4 then travels in the direction of the arrow x to the station B wherein means such as a rotating cutter provide an appropriate roughened finish to the spine of the book to receive an adhesive. The particles released by this operation are sucked away into the sack 5. The prepared book in the clamp then moves through glue applying station C where an appropriate roller or other means in a reservoir applies hot or cold glue to the back of the book. The clamp moves without delays through stations B and C to the end of the machine and through cover applying station D where a book cover 6 is fed flat to arrive at the nipping station E as shown in FIG. 3. Here the cover lies flat across a platten made up of two plates 70 and 8 separated by a narrow gap or nip 9. The book 7 is supported by the clamp 4 with the spine with adhesive presented face down to the cover 6. The assembly of book 7 and cover 6 is delayed at the position shown in FIG. 3 by the means according to the invention and during this delay the platten moves upwardly so that the nip 9 forms the cover around the back of the book. The jaws of the nip, plates 70 and 8, then move inwardly to press the cover around the spine of the book and complete the book. The clamp then moves onwardly to the discharge station F where the book clamp is opened and the book falls away to the discharge position. Suitable drive and co-ordinating means are provided for the track and the associated mechanical functions such as the nipping described above. The opening and closing of the clamp are usually achieved by cam surfaces provided at appropriate locations around the track.

FIG. 3 also shows some constructional details of clamp 4 which comprises a deep back plate 10 against which the book 7 rests and a clamping bar 30. Spring bias from the rear applies the clamping force to plate 10. The spring force can be relieved by rotation of knobs 12 and 13 to open the clamp. Right hand knob 13 can be unscrewed to allow bar 30 to be lifted about the other knob. A pin stop 14 against which the head of the book 7 abuts can be moved to any one of a plurality of locations 15 to locate a book end as shown. An adjustable stop 29 is provided to locate the cover 6 fed onto the platten. It should be noted that extra depth of cover is provided at the base of the book. The machine includes cam surfaces automatically to open the clamp against spring bias for loading and discharge at stations A and F, respectively, and to allow the clamp to close for stations B to E.

Figure 2:
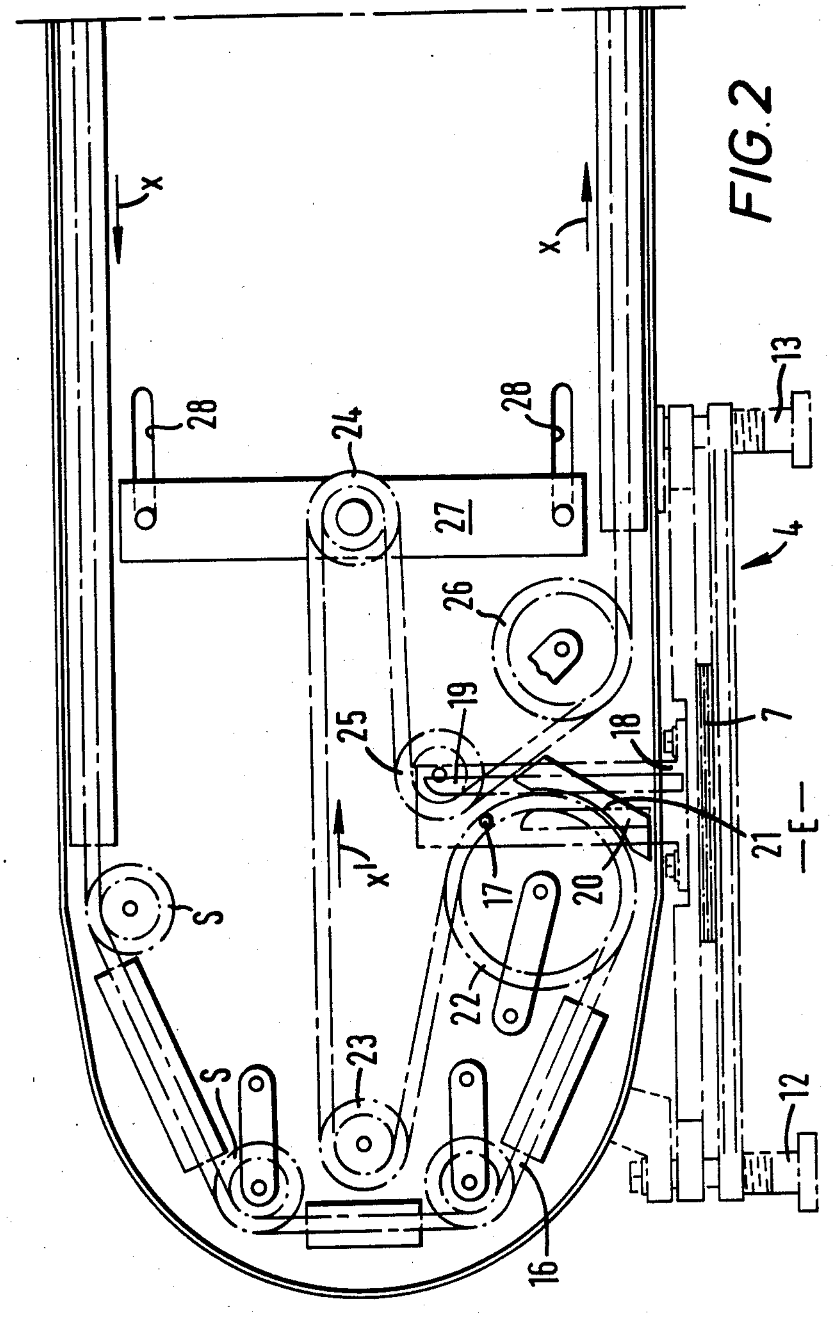
FIG. 2 is an enlarged plan view showing the interior of the machine with the track.
Figure 4:
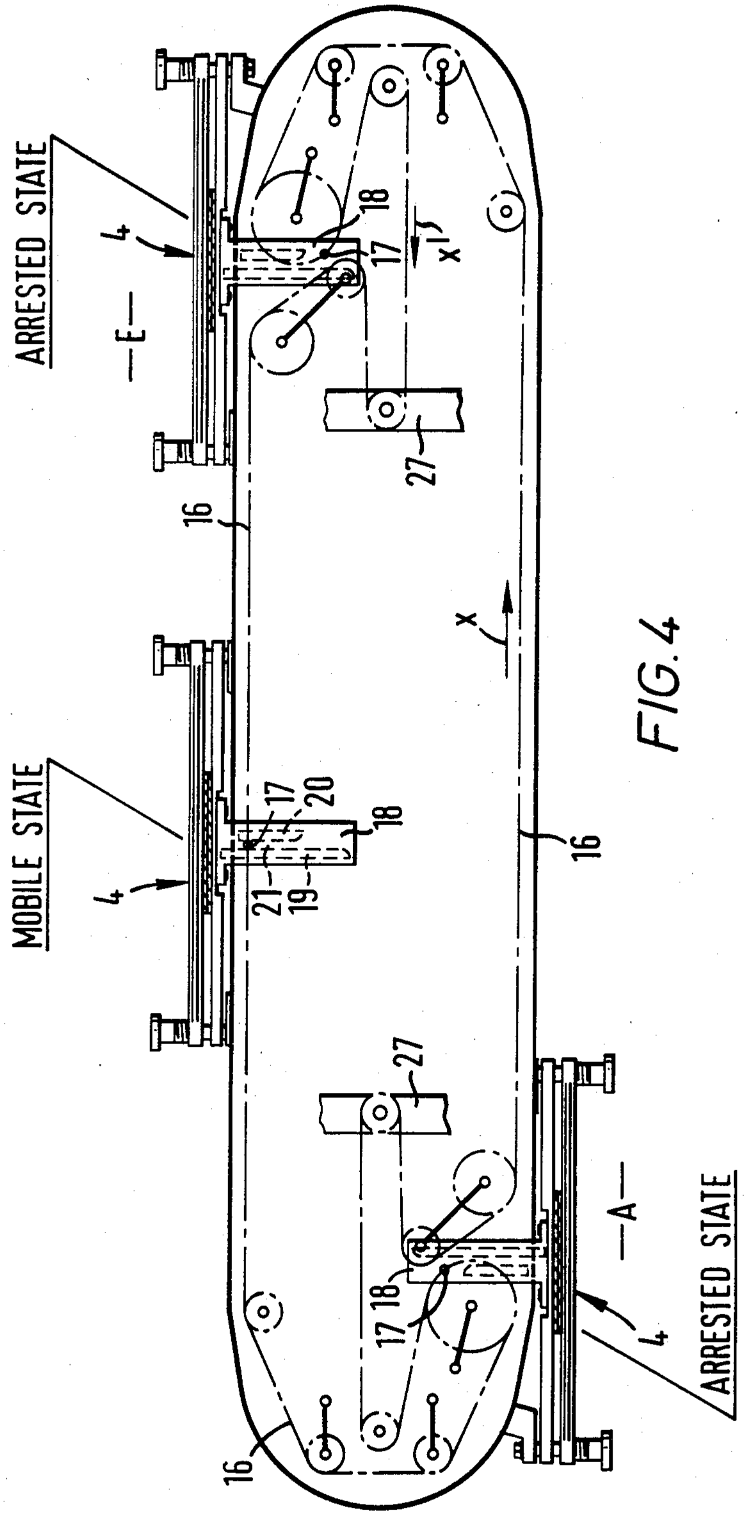
FIG. 4 is a plan view showing the interior of the machine with three clamps, two clamps in an arrested state and one clamp in a mobile state.

Referring now to FIGS. 1, 2 and 4 of the drawings and the improvement of the present invention, the track for advancing clamp 4 is a closed loop of chain 16 (or other functional equivalent such as a belt) driven to perform a linear advance around a plurality of sprockets generally referenced S. FIG. 2 shows the track at station E. The track moves in the anticlockwise direction x. The chain comprises a plurality of drive studs 17, one for each of the three book clamps 4 (see FIG. 4). One of these studs 17 is illustrated and extends outwardly from the plane of the drawing.

Bolted to the rear of each book clamp 4 adjacent the base is a bracket 18 comprising a long guide block 19 and a shorter guide block 20. A channel 21 is defined between blocks 19 and 20.

To delay the clamp 4 at Station E whilst chain 16 is advancing, the chain runs in an idle reach. Thus the chain 16 winds round a first sprocket 22 leading the chain 16 away from and in a direction opposite to the main run in direction x. The chain 16 then runs round sprocket 23 to a run in a direction x' parallel to but spaced from the main reach as it leaves station E. The chain then runs over another sprocket 24 to change direction again, to a sprocket 25 to be directed outwardly and forwardly and finally round sprocket 26 to join the main reach. Sprocket 24 is mounted on a chain tensioning carrier 27 movable in elongate slots 28.

In use of the machine, the stud 17 engaged in the channel 21 and abutting guide block 19 drives clamp 4 round the normal working reaches of the chain. When the clamp 4 driven by the stud 17 arrives at sprocket 22 the stud 17 performs a part circular path and is guided out of the channel 21 to the position illustrated. At this stage forward movement of the clamp 4 ceases and the chain link with the stud 17 runs round the idle reaches guided by sprockets 23, 24, 25 and 26 to re-enter the channel 21 and recommences driving the clamp 4. In this phase, the clamp behind approaches more closely the clamp 4 being worked upon at station E (see FIG. 4). This is an important advantage of the invention for reasons which will be explained.

The arrested phase of the clamp 4 is sufficient for the cover-applying and nipping operation hereinbefore described to be carried out. The disengagement of the drive from the clamp and the reengagement is gradual governed by the radius of the sprockets so no rapid deceleration or acceleration occurs particularly as only one clamp is being stopped or started at any given time. It will be appreciated that by suitable adjustment of the length of the idle reach the stopping time at each station can be appropriately determined.

A similar arrangement of sprockets is provided at station A to provide the necessary pause for loading the book. Thus whilst the book is arrested at station E, the cutting and gluing of the advancing book behind is being carried out at stations B and C and a similar situation prevails at station A. This gives the machine a greater effective speed of operation, and a binding capacity of 1250 books an hour, for example, can be achieved.

Previous continuously running machines have involved the simultaneous arresting and restarting of all the clamps on the machine, and the present invention, with the possibility of selectively arresting one or a plurality of clamps whilst the remaining clamps remain running, offers considerable operational advantages, some of which are outlined above.

What is claimed is:

1. A bookbinding machine comprising:
- a plurality of book clamps;
- means for defining a closed fixed path;
- driveable track means for advancing the clamps along said fixed path through a plurality of processing stations; and
- means for arresting the movement of a selected one or more of the clamps in the fixed path while the other clamps remain in motion along the same fixed path.

2. A machine according to claim 1 wherein the track means describes a closed path.

3. A machine as claimed in claim 1 comprising a loading station, a cover applying station and, intermediate said stations, stations for processing the back of the book and feeding a cover, wherein the means for arresting the movement are provided at the loading and cover applying stations.

4. A machine according to claim 1 wherein means are provided for disengaging the clamp from the track means to arrest the motion of the clamp.

5. A machine according to claim 4 wherein the advancing track means is caused to perform an excursion returning to said clamp to continue the drive motion after a predetermined interval.

6. A machine according to claim 5 wherein the track means is a chain or equivalent member with a discrete drive element for each clamp, wherein each clamp has structure defining a channel within which the said element is positioned to drive the clamp, and wherein guide means for the chain lead the said element out of the channel at the selected position to arrest the motion of the clamp and return the element to the channel to resume the said motion.

* * * * *